United States Patent [19]
Buzzell et al.

[11] 3,981,245
[45] Sept. 21, 1976

[54] ELECTRICAL SETBACK GENERATOR

[75] Inventors: Colby E. Buzzell, Wilmington, Mass.; Richard T. Ziemba, Burlington, Vt.

[73] Assignee: General Electric Company, Burlington, Vt.

[22] Filed: Dec. 17, 1974

[21] Appl. No.: 533,682

[52] U.S. Cl. .......................... 102/70.2 GA; 310/12
[51] Int. Cl.² ........................................ F42C 11/04
[58] Field of Search .............. 102/70.2 GA, 70.2 R; 310/12

[56] References Cited
UNITED STATES PATENTS

| | | | |
|---|---|---|---|
| 2,825,863 | 3/1958 | Krupen ...................... | 102/70.2 GA |
| 3,094,635 | 6/1963 | Wysocki ..................... | 310/12 |
| 3,119,335 | 1/1964 | Wyser ........................ | 102/70.2 GA |
| 3,120,187 | 2/1964 | Wyser ........................ | 102/70.2 GA |

*Primary Examiner*—Charles T. Jordan
*Attorney, Agent, or Firm*—Bailin L. Kuch

[57] ABSTRACT

An electrical setback generator for ammunition fuses is provided which has a core which extracts energy from a magnetic field through a reverse saturation cycle.

26 Claims, 10 Drawing Figures

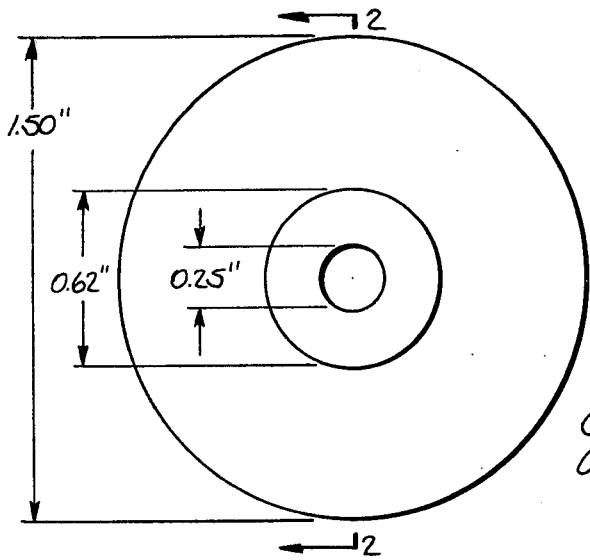
Fig.1.
PRIOR ART
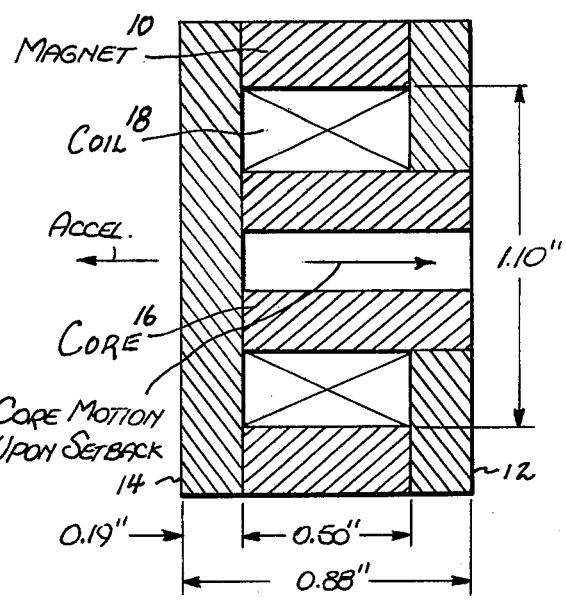
Fig.2.
PRIOR ART
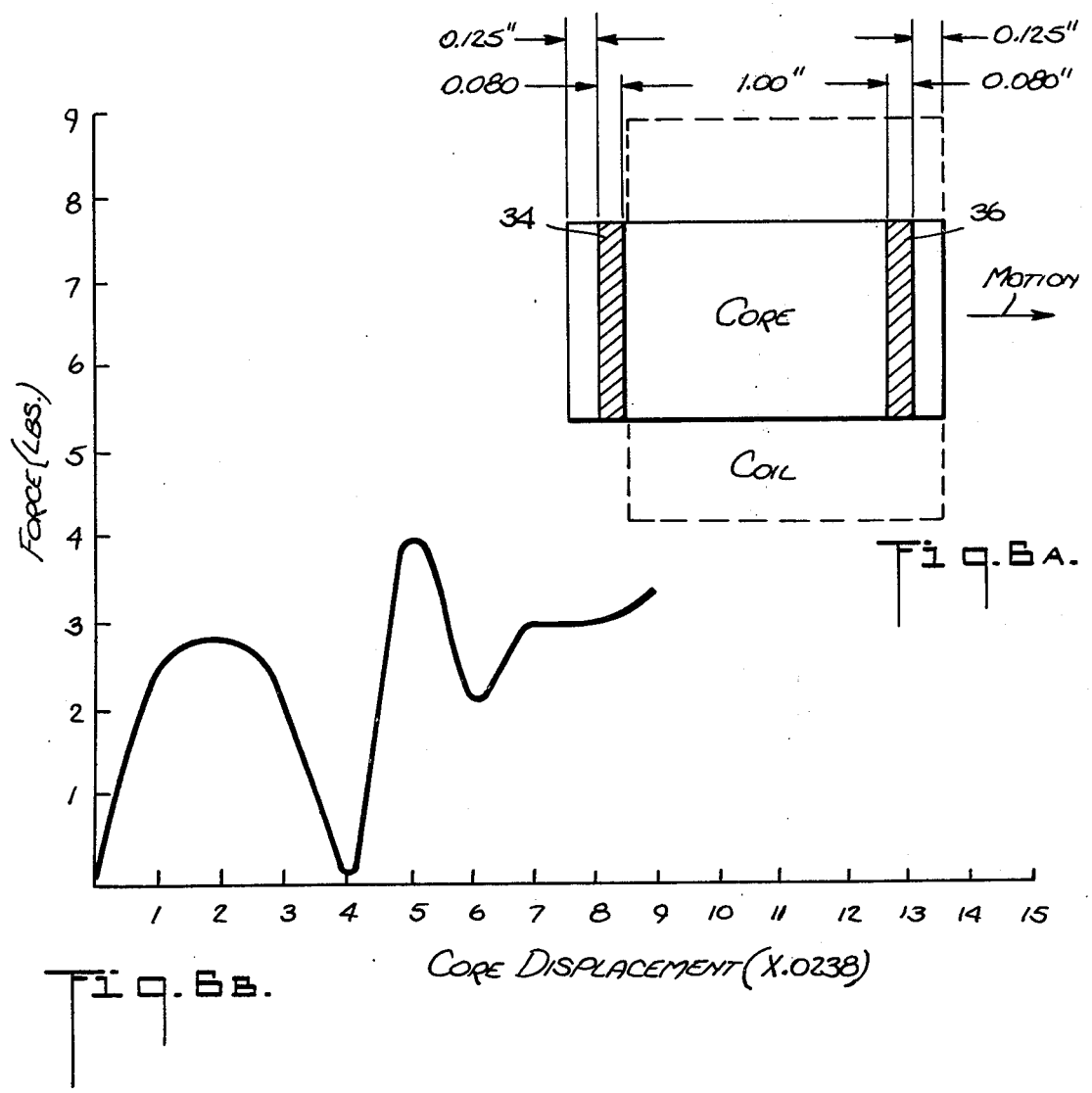
Fig.6A.
Fig.6B.

3,981,245

ELECTRICAL SETBACK GENERATOR

BACKGROUND OF THE INVENTION

1. Field of Art

This invention relates generally to electrical generators, and especially to a setback or inertia generator for projectile electrical fuzes.

2. Prior Art

An early setback generator is shown in U.S. Pat. NO. 3,120.187 issued to G. Wyser on Feb. 4, 1964. A more recent setback generator is shown in FIGS. 1 and 2. The generator consists of a relatively large, hollow cylindrical cast "Alnico-5" magnet 10, two magnetically soft end caps, one a washer 12, and the other a disk 14, a cylindrical core 16 which completes the magnetic circuit, and a coil 18 hich surrounds the core. Sufficient flux is generated by the permanent magnet 10 to completely saturate the core 16, and the core is held in place against the inside face of the end cap 14 by the force of magnetic attraction. Upon setback, the core 16 moves away from the end cap 14, and the magnetic field in the core collapses to almost zero. This collapsing field induces a current in the coil which charges a capacitor through a series diode. The energy stored in the capacitor is then used to power a fuze detonating circuit, as by an electrical timing circuit operating an electrical detonator. The energy that can be derived from such a generator is dependent on the magnitude of the field in the core and its rate of decay, and on the dynamic response of the inductance-resistance-capacitance circuit. For the prior art device described, core saturation at 15K gauss is a fundamental limitation. Higher storage energies can be achieved only by increasing the size of the core and the permanent magnet and by modifying the inductance and resistance parameter of the coil for optimum charging. An exemplory prior art device having an overall diameter of 1.5 inches and a length of 0.88 inches provided $225 \times 10^6$ Erg output energy.

BRIEF SUMMARY OF THE INVENTION

It is an object of this invention to provide an improved setback generator having twice the output energy of a prior art device of the same volume.

It is another object of this invention to provide an improved setback generator with an electromagnetic safing system.

A feature of this invention is the provision of a setback generator having a core which extracts energy from a magnetic field throuogh a reverse saturation cycle.

BRIEF DESCRIPTION OF THE DRAWING

These and other objects, features, and advantages of the invention will be apparent from the following specification thereof taken in conjunction with the accompanying drawing in which:

FIG. 1 is an end view of a prior art generator;

FIG. 2 is a longitudinal cross-section taken along plane 2—2 of FIG. 1;

FIG. 5 is a schematic of the electrical circuit of a fuze embodying a setback generator;

FIG. 6A is a dimensioned longitudinal cross-section of a typical core assembly of the generator of FIG. 3;

FIG. 6B is a typical force v. displacement curve for the generator of FIG. 3;

THE PREFERRED EMBODIMENT

As mentioned above, the energy available from the prior art configuration is limited by the large volume occupied by the magnet 10, which, in turn, limits the volume of the coil 18, and by the fact that the change in flux seen by the coil during setback cannot exceed the initial core flux.

Figure 3:
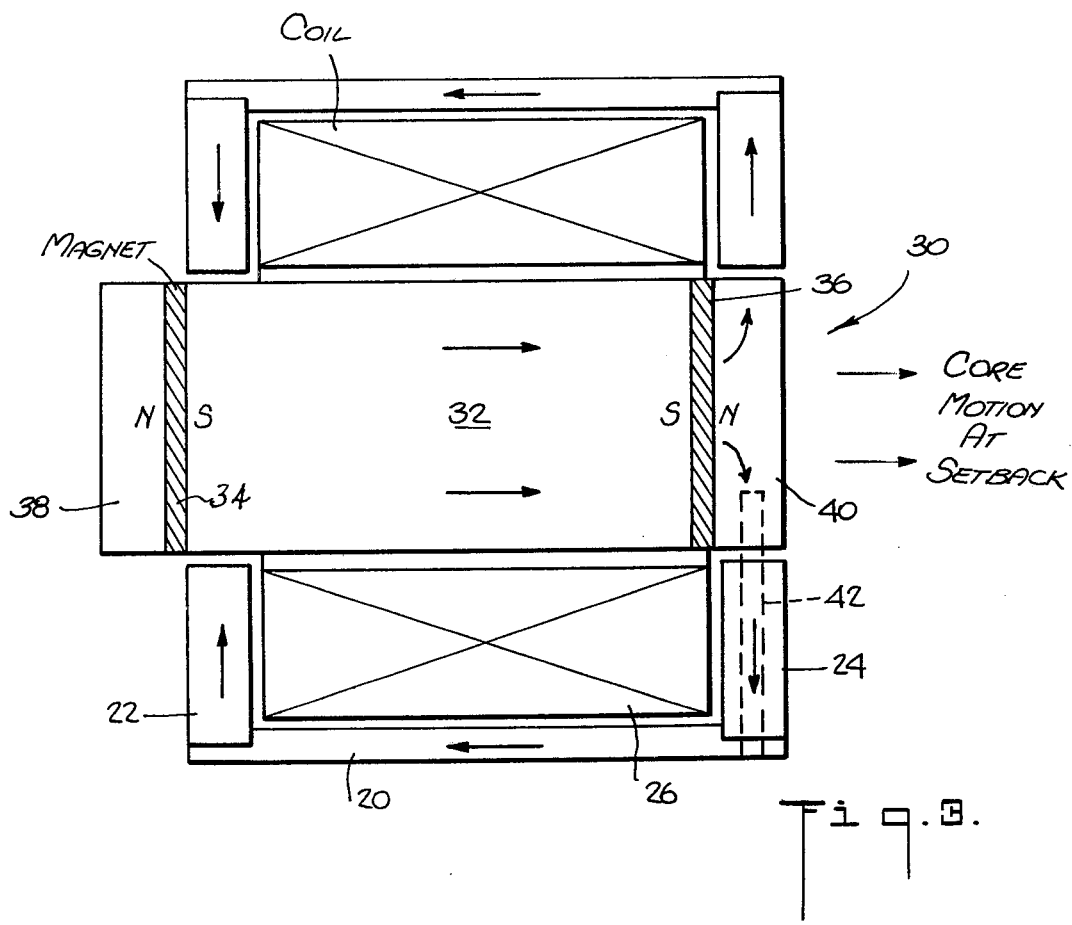
FIG. 3 is a longitudinal cross-section of a generator embodying this invention.

A generator embodying this invention is shown in FIG. 3. This generator may be installed in a fuze of the type shown by R. T. Ziemba in U.S. Pat No. 3,844,217 issued Oct. 29, 1974. The generator comprises a iron frame consisting of a central tube 20 and two annular end rings 22 and 24. A coil 26 may be wound on a fiber glass coil form. The core 30 comprises a central iron portion 32, a left hand high energy magnetic disk 34, a right hand high energy magnetic disk 36, a distal, left hand iron disk 38, and a distal, right hand iron disk 40. The polarities of the magnets are opposing. In the armed position shown in FIG. 3 the right hand magnet 36 produces flux through the core and frame of one polarity, while the left hand magnet 34 is air-circuited and expends most of its magnetomotive force producing leakage flux outside the frame. During setback, the core moves to the opposite position in which the left hand magnet 34 produces flux through the core and frame of opposite polarity, while the right hand magnet 36 air-circuited. The use of two oppositely polarized, spaced apart magnets doubles the flux change seen by the coil which, in turn, doubles the volt-seconds time integral.

Additionally, the outside cylinder 20 can have a much thinner cross-section than the magnet 10 used in that position in the prior art. This permits more volume for increased core size and optimization of coil impedance, resulting in further increase in output energy. Since this invention requires that the magnets operate between air-circuit and essentially closed-circuit conditions, it is necessary to use a magnetic material which, in addition to having a high value of residual induction, does not lose its flux producing capability when exposed to air knockdown. Samarium cobalt ($SmCo_5$), a rare earth magnet material, has exceptional capabilities in this regard. When an air exposed magnet is closed-circuited, it operates on a minor loop which is nearly parallel to the upper portion of its major flux density v. magnetic intensity or saturation curve or B/H curve. A $SmCo_5$ magnet returns to essentially its original point on the B/H curve after air circuit operation, whereas the flux output from a conventional Alnico magnet would be reduced by nearly seventy percent after air-circuit operation. "Air-circuit" or "incomplete magnetic circuit" implies the condition in which the magnetic flux lines extend, partly at least, through air; "closed-circuit" or "complete magnetic circuit" implies that the magnetic flux lines pass substantially entirely through magnetic material.

The magnet design has only two mechanical parameters: thickness and diameter. The thickness of the magnet disk has a basic limitation: it cannot exceed half the distance allowed for setback motion. Further, to assure that the movement of the core assembly 30 be smooth and uninterrupted, it is desirable for the thickness of the magnet disks 34, 36 to be slightly less than the thickness of the frame end disks 22, 24. Selection of magnet diameter poses a problem of optimization: Since core flux increases with the square of magnet diameter, maximum diameter is desirable. However, increased diameter reduces winding volume and requires either fewer turns or the use of finer wire having a higher resistance. Winding resistance can be one of the major factors in limiting output.

This thin magnet disk generator of FIG. 3 may be conveniently safed by the provision of a shear pin 42 disposed in aligned bores through the frame and the core.

Figure 4:
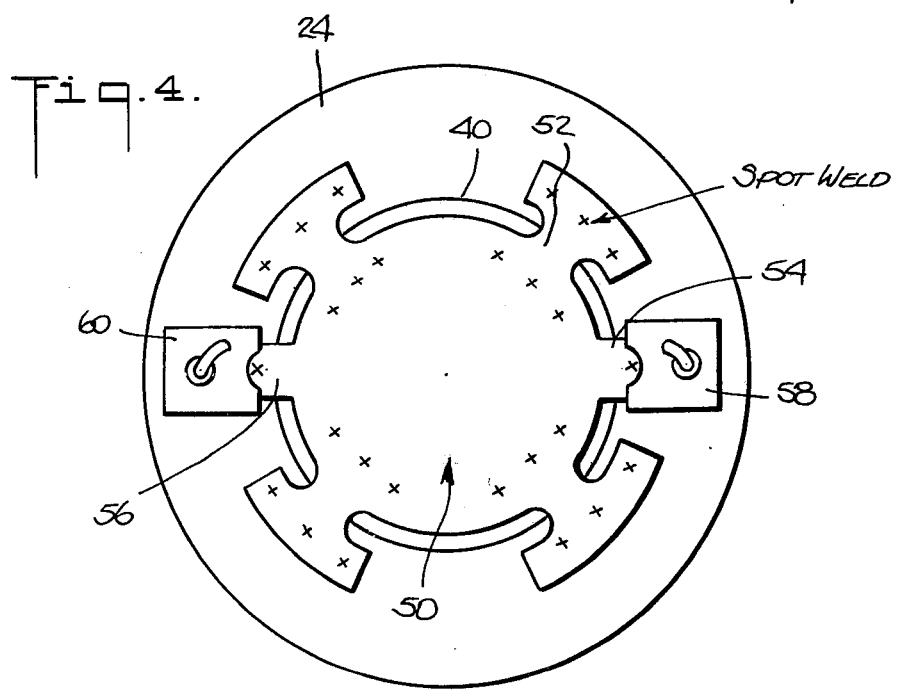
FIG. 4 is an end view of the generator of FIG. 3.

Alternatively, as shown in FIG. 4, a sheet metal spider 50 may be spot welded to the core disk 40 and the frame annular disc 24. The setback force causes the legs 52 of the spider to shear. Also, two short arms 54, 56 are spot welded to two conductive pads 58, 60 respectively, which pads are insulated from the frame, and to which the coil leads are terminated. Thus, while the core is in its armed position, the coil is short circuited by the spider and cannot generate any significant voltage from exposure to externally enduced electric fields. Upon setback, the arms break away from the pads, allowing the generation of the normal pulse.

As seen in FIG. 5, the generator 11 provides a voltage through a rectifying diode 66, which is limited by a zener diode 68 to a capacitor 70. The energy stored in the capacitor is ultimately coupled by appropriate fuze electronics 72 to a hot wire detonator 74.

The thin magnetic disk generator of FIG. 3 typically has a force v. core displacement of the type shown in FIG. 6B. Any significant displacement requires a first threshhold force (here shown as 3 pounds), but after this displacement a yet higher force (here shown as 4 pounds) is required to achieve full displacement. Should an intermediate force be provided the core will hang up between the two peaks of the curve.

Figure 7A:
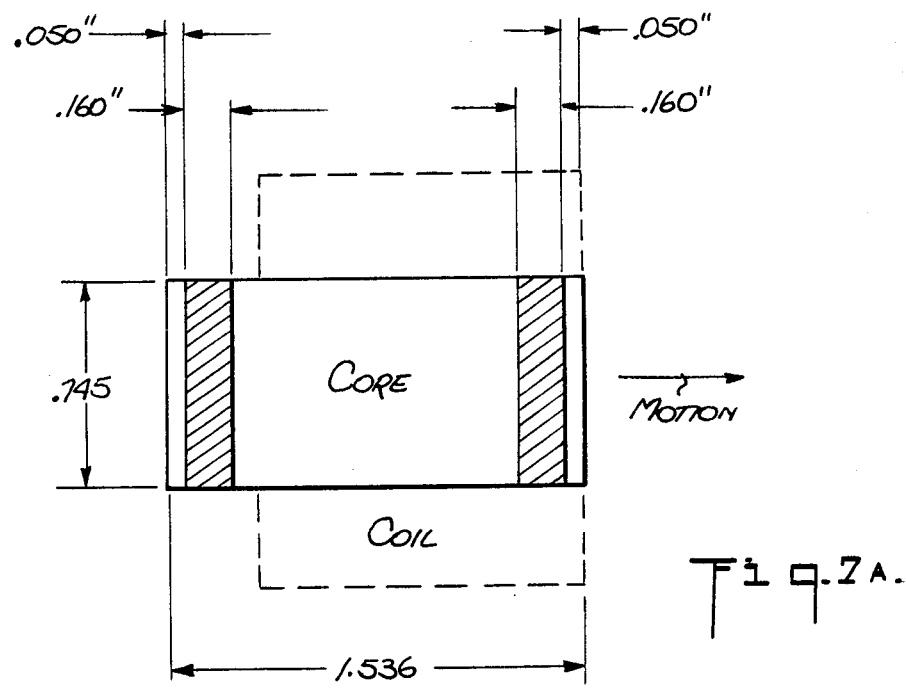
FIG. 7A is a dimensioned longitudinal cross-section of a typical core assembly of a modified generator embodying this invention.
Figure 7B:
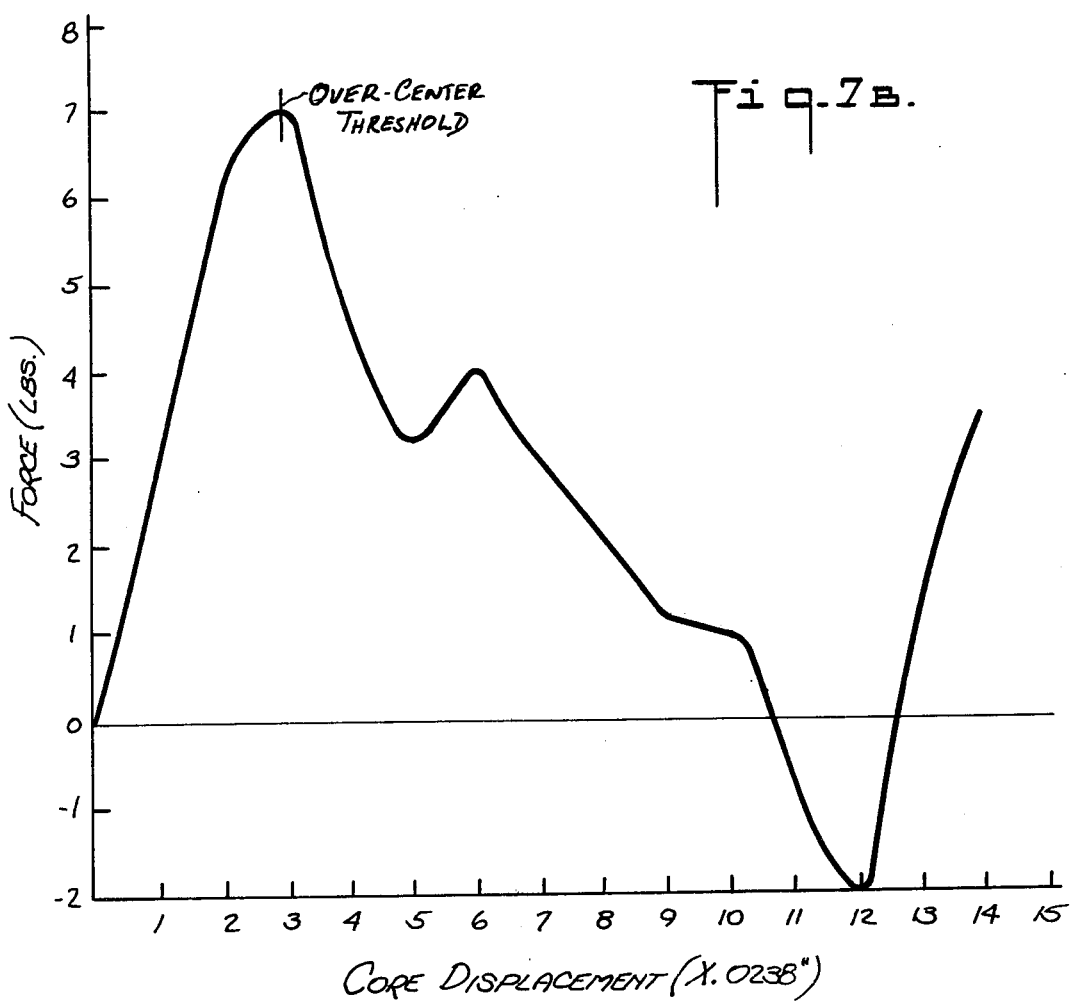
FIG. 7B is a typical force v. dispalcement curve for the generator of FIG. 7A.

The force v. displacement curve may be altered from that shown in FIG. 6B to that shown in FIG. 7B by increasing the thickness of the magnetic disks to something greater than the thickness of the frame end plates, e.g. doubling the thickness of the disks, as shown in FIG. 7A. As seen in FIG. 7B an high initial force is required to provide any initial significant displacement, but afterwards the force required decreases through zero like a magnetic spring, and then up to a lesser negative force. If a force less than the high initial force is provided, the core will suffer a slight displacement and return to zero when the force is removed.

The thick disk generator provides an additional benefit: the output energy from this generator is typically twice that of the thin disk generator. A higher magnetic flux field and a more optimum spacing between the magnetic disks accounts for this increased performance.

The higher force required can be provided for the same acceleration by increasing the mass of the moving element of the generator. A simple solution is to have the heavier coil move, rather than the lighter core assembly.

Figure 8:
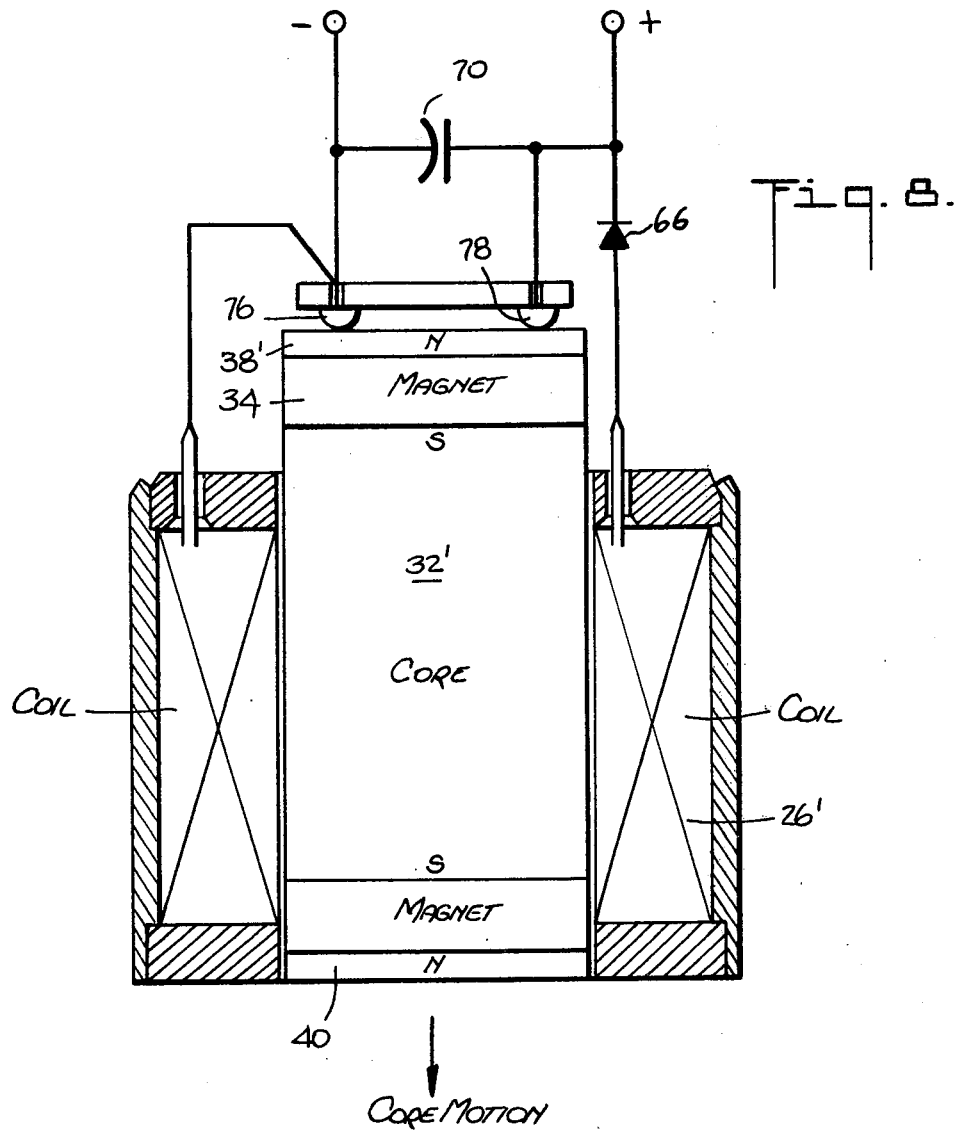
FIG. 8 is a longitudinal cross-section of a modification of the generator of FIG. 7A.
Figure 9:
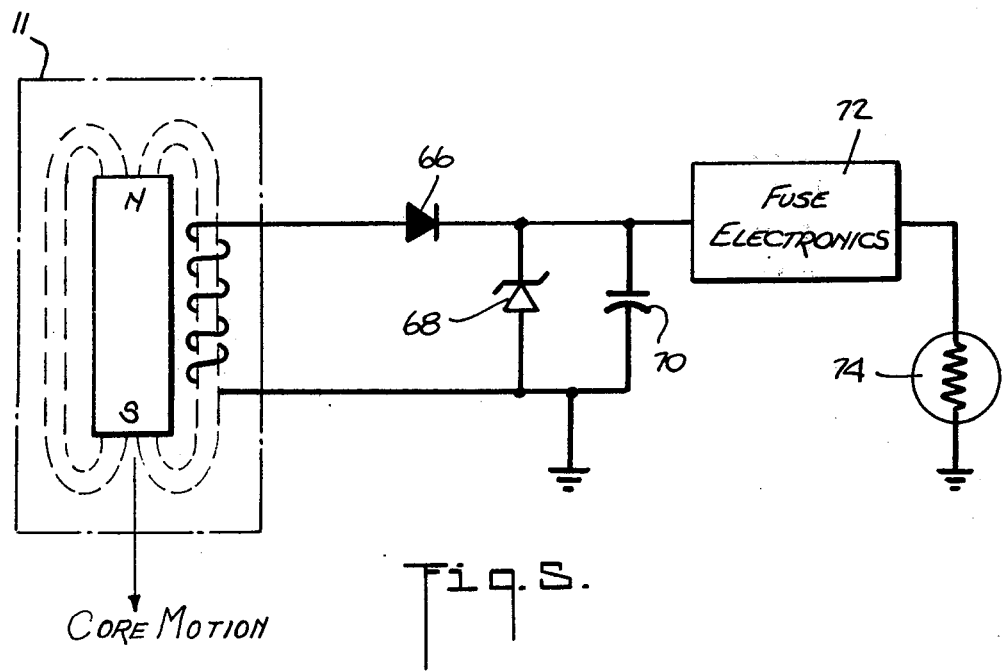

An electrical safing modificaiton is shown in FIG. 8. It combines the magnetic spring effect of the thick magnetic disks with a capacitor shorting bar. The capacitor 70 is provided with two shorting contacts 76, 78 which are normally abuted and short-circuited by the end of the core assembly. The core assembly is designed to open the short-circuit and remain open only if a sufficient force is provided. If this force is not achieved, the core assembly is magnetically returned to its original position and the energy stored in the capacitor is dumped. It should be noted that once the core has received the necessary forces, it completes a full displacement, and it will not return to its start position.

What is claimed is:

1. A setback generator comprising:
   a first incomplete magnetically permeable circuit;
   an electrical conductor magnetically coupled to said circuit;
   a second incomplete magnetically permeable circuit including two sources of magnetic flux of opposing polarity spaced apart by magnetically permeable means of such length that only one of said sources can be coupled to said first circuit at any time;
   said first and second circuits being mutually interjournalled to permit relative translation therebetween, whereby first one of said sources and then the other of said sources can be coupled to said first circuit to provide a complete reversal of magnetic flux through said first circuit and a corresponding energy in said electrical conductor.

2. A generator according to claim 1 wherein:
   said first circuit includes
      a first annular end plate, and
      a second annular end plate, spaced from said first plate by a first distance,
   said second circuit includes a core assembly journalled for reciprocation through the apertures of said plates,
   said first source being spaced from said second source by a second distance which is greater than said first distance whereby when one of said sources is in planar alignment with one of said plates, and the remainder of said second circuit completes said first circuit, said other of said sources is external to said completed circuit.

3. A generator according to claim 2 wherein:
   each of said magnetic flux sources comprises a disk of permanent magnetic material having poles at the faces of said disks.

4. A generator according to claim 3 wherein:
   each of said magnetic flux sources further comprises a disk of magnetically permeable material fixed to that face of the magnetic disk which is remote from said other magnetic source.

5. A generator according to claim 4 wherein:
   said first and second end plates are each of a first thickness, and
   said magnetically permeable material disks are each of a second thickness equal to said first thickness.

6. A generator according to claim 4 wherein:
   said first and second end plates are each of a first thickness, and
   said magnetic source disks are each of a thickness less than said first thickness.

7. A generator according to claim 4 wherein:
   said first and second end plates are each of a first thickness, and
   said magnetic source disks are each of a thickness greater than said first thickness.

8. A generator according to claim 1 wherein:
   said electrical conductor is a coil in series with a rectifier diode and a capacitor.

9. A generator according to claim 8 wherein:
said capacitor has a pair of shorting contacts, and
said second circuit includes a shorting contact adapted to normally engage said shorting contacts and to disengage upon relative translation with respect to said first circuit.

10. A generator according to claim 1 further including:
rupturable means fixed to and between said first and second magnetically permeable circuits, for normally precluding relative translation therebetween, and adapted to be ruptured by a setback force of greater than a predetermined force, to permit relative translation therebetween.

11. A generator according to claim 1 wherein:
a magnetic force of a predetermined strength normally holds one of said sources coupled to said first circuit and the other of said sources decoupled from said first circuit, whereby a setback force of less than said predetermined strength is inadequate to fully translate said second circuit to decouple said one of said sources and to couple said other of said sources, and a setback force of greater than said predetermined strength is adequate to fully translate said second circuit to decouple said one of said sources and to couple said other of said sources.

12. A generator, according to claim 11 wherein:
an initial setback force of greater than said predetermined force is required to provide any initial significant translation, but after such initial translation, the force required to complete the translation decreases through zero and then rises to a less than said predetermined force upon complete translation.

13. A generator according to claim 7, wherein:
a magnetic force of a predetermined strength normally holds one of said sources coupled to said first circuit and the other of said sources decoupled from said first circuit, whereby a setback force of less than said predetermined strength is inadequate to fully translate said second circuit to decouple said one of said sources and to couple said other of said sources, and a setback force of greater than said predetermined strength is adequate to fully translate said second circuit to decouple said one of said sources and to couple said other of said sources.

14. A generator according to claim 13 wherein:
an initial setback force of greater than said predetermined force is required to provide any significant translation, but after such initial translation, the force required to complete the translation decreases through zero and then rises to a less than said predetermined force upon complete translation.

15. A setback generator comprising: a first and a second magnetic device, each one considered by itself, having its flux field lines extending at least partially through air;
an electrical conductor magnetically coupled to said first device;
the second magnetic device including two sources of magnetic flux of opposing polarity spaced apart by magnetically permeable means of such length that only one of said sources can be coupled to said first device at any time;
said first and second devices being mutually interjournalled to permit relative translation therebetween, whereby first one of said sources and then the other of said sources can be coupled to said first device, thereby to induce energy in said electrical conductor.

16. A generator according to claim 15 wherein:
said first device includes
a first annular end plate, and
a second annular end plate, spaced from said first plate by a first distance,
said second device includes a core assembly journalled for reciprocation through the apertures of said plates,
said first source being spaced from said second source by a second distance which is greater than said first distance whereby when one of said sources is in planar alignment with one of said plates, and the remainder of said second device completes the magnetic circuit of the first device, the said other source is external to said completed magnetic circuit.

17. A generator according to Claim 15 wherein:
each of said magnetic flux sources comprises a disk of permanent magnetic material having poles at the faces of said disks.

18. A generator according to claim 17 wherein:
each of said magnetic flux sources further comprises a disk of magnetically permeable material fixed to that face of the magnetic disk which is remote from the said other magnetic source.

19. A generator according to claim 18 wherein:
said first and second end plates are each of a first thickness, and
said magnetically permeable material disks are each of a second thickness equal to said first thickness.

20. A generator according to claim 18 wherein:
said first and second end plates are each of a first thickness, and
said magnetic source disks are each of a thickness less than said first thickness.

21. A generator according to claim 18 wherein:
said first and second end plates are each of a first thickness, and
said magnetic source disks are each of a thickness greater than said first thickness.

22. A generator according to claim 15 wherein:
said electrical conductor is a coil which is connected in series with a rectifier diode and a capacitor.

23. A generator according to claim 22 wherein:
said capacitor has a pair of shorting contacts, and
said second circuit includes a shorting contact adapted to normally engage said shorting contacts and to disengage upon relative translation with respect to said first circuit.

24. A generator according to claim 15 further including:
rupturable means fixed to and between said first and second magnetically permeable circuits, for normally precluding relative translation therebetween, and adapted to be ruptured by a setback force of greater than a predetermined force, to permit relative translation therebetween.

25. A generator according to claim 15 wherein:
a magnetic force of a threshold strength normally holds one of said sources coupled to said first device and the other of said sources decoupled from said first device, whereby a setback force of less than said threshold strength is inadequate to fully actuate said second device to decouple the said one source and to couple the said other source, and a setback force of greater than said threshold strength is adequate to fully actuate said second device to decouple the said one source and to couple the said other source.

26. A generator, according to claim 25 wherein: an initial setback force of greater than said threshold force is required to provide any initial significant actuation, but after such initial actuation, the force required to complete the actuation decreases through zero to a force-value less than the threshold force-value upon complete actuation.

* * * * *